United States Patent
Xiao

(10) Patent No.: US 12,086,325 B2
(45) Date of Patent: Sep. 10, 2024

(54) WEARABLE DEVICE AND SCREEN WAKE-UP METHOD THEREOF, AND READABLE STORAGE MEDIUM

(71) Applicant: GOERTEK INC., Shandong (CN)

(72) Inventor: Liangping Xiao, Shandong (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 18/044,986

(22) PCT Filed: Nov. 30, 2020

(86) PCT No.: PCT/CN2020/132567
§ 371 (c)(1),
(2) Date: Mar. 11, 2023

(87) PCT Pub. No.: WO2022/057093
PCT Pub. Date: Mar. 24, 2022

(65) Prior Publication Data
US 2023/0359281 A1    Nov. 9, 2023

(30) Foreign Application Priority Data
Sep. 16, 2020  (CN) .......................... 202010974626.8

(51) Int. Cl.
*G06F 3/01*    (2006.01)
*G06F 3/03*    (2006.01)
(Continued)

(52) U.S. Cl.
CPC .............. *G06F 3/017* (2013.01); *G06F 3/014* (2013.01); *G06F 3/0325* (2013.01); *G06F 3/0346* (2013.01); *G06F 1/163* (2013.01)

(58) Field of Classification Search
CPC ...... G06F 3/017; G06F 3/014; G06F 3/03325; G06F 3/03346
See application file for complete search history.

(56) References Cited

U.S. PATENT DOCUMENTS

2015/0185837 A1\*  7/2015  Whitney ................. G06F 3/014
                                              345/156
2016/0026236 A1    1/2016  Vasistha et al.
(Continued)

FOREIGN PATENT DOCUMENTS

CN    102890608 A    1/2013
CN    103345355 A    10/2013
(Continued)

OTHER PUBLICATIONS

International Search Report from International Application No. PCT/CN2020/132567 mailed Jun. 16, 2021.

*Primary Examiner* — Liliana Cerullo
(74) *Attorney, Agent, or Firm* — Shih IP Law Group, PLLC

(57) ABSTRACT

A screen wake-up method, which is applied to a wearable device. The method includes: when a screen of a wearable device is in a turned-off state, performing an illuminance monitoring operation on a set position of the wearable device to obtain illuminance data (S10); identifying a contact operation corresponding to the set position according to the illuminance data (S20); and when the contact operation satisfies the set contact condition corresponding to screen wake-up, controlling the screen to be switched to a turned-on state (S30). Further disclosed are a wearable device and a readable storage medium, which may improve the endurance capabilities of the wearable device.

9 Claims, 3 Drawing Sheets

(51) Int. Cl.
    *G06F 3/0346*     (2013.01)
    *G06F 1/16*     (2006.01)

(56) References Cited

U.S. PATENT DOCUMENTS

2019/0096357 A1*   3/2019   Lee ........................ G06F 3/0304
2019/0129491 A1*   5/2019   Biederman, III ....... G06F 3/017

FOREIGN PATENT DOCUMENTS

| | | |
|---|---|---|
| CN | 103581443 A | 2/2014 |
| CN | 103713735 A | 4/2014 |
| CN | 103826365 A | 5/2014 |
| CN | 105376422 A | 3/2016 |
| CN | 109189637 A | 1/2019 |
| CN | 109558019 A | 4/2019 |
| CN | 111182340 A | 5/2020 |
| CN | 111596751 A | 8/2020 |
| EP | 2884383 A1 | 6/2015 |

* cited by examiner

WEARABLE DEVICE AND SCREEN WAKE-UP METHOD THEREOF, AND READABLE STORAGE MEDIUM

The present disclosure claims the priority to the Chinese patent application No. 202010974626.8, titled "Wearable Device and Screen Wake-Up Method Thereof, and Readable Storage Medium", filed with the China Patent Office on Sep. 16, 2020, the entire content of which is incorporated herein by reference as if fully set forth herein.

BACKGROUND ART

The present disclosure relates to a technical field of wearable device, in particular to a screen wake-up method, a wearable device and a readable storage medium.

DESCRIPTION OF RELATED ART

With the development of economy and technology, wearable devices are more and more widely used in people's daily life, and people have higher and higher performance requirements for wearable devices. For example, for most wearable devices, the screen of the device is turned off when the user does not need to use the device, and the screen is waken up when the user needs to use the device.

At present, the wake-up of the screen of the wearable device is generally performed by identifying the user's operation of lifting the device, and the screen is waken up when the user's lifting operation is identified. However, in this way, all lifting operations of the user in daily life may wake up the screen, causing the screen of the device to be unnecessarily turned on when the user does not need to use the device, for example, the screen of the device is turned on when the user wearing a bracelet lifts his hand to greet to others, which seriously affects the endurance capabilities of the device.

SUMMARY

The main purpose of this disclosure is to provide a screen wake-up method, aiming at improving the endurance capabilities of a wearable device.

In order to achieve the above purpose, the present disclosure provides a screen wake-up method which is applied to a wearable device, wherein the screen wake-up method includes following steps:
  when a screen of the wearable device is in a turn-off state, performing an illuminance monitoring operation on a set position of the wearable device to obtain illuminance data;
  identifying a contact operation corresponding to the set position according to the illuminance data;
  when the contact operation satisfies a set contact condition corresponding to screen wake-up, controlling the screen to be switched to a turned-on state.

Optionally, the illuminance data includes at least two illuminance values, and the step of identifying a contact operation corresponding to the set position according to the illuminance data includes:
  when a first illuminance value is less than or equal to a first illuminance threshold and a second illuminance value is greater than the first illuminance threshold, determining that the contact operation exists;
  wherein, among the at least two illuminance values, one of two illuminance values whose collecting timings are adjacent to each other is defined as the first illuminance value, and the other one of two illuminance values whose collecting timings are adjacent to each other is defined as the second illuminance value.

Optionally, after the step of determining that the contact operation exists, the screen wake-up method further includes:
  obtaining number of times of operations corresponding to the contact operations within a first set duration; and
  when the number of times of operations reaches a first set number of times, determining that the contact operation satisfies the set contact condition corresponding to the screen wake-up;
  wherein, the first set number of times is more than once.

Optionally, the illuminance data includes at least two illuminance values, and wherein after the step of performing an illuminance monitoring operation on a set position of the wearable device to obtain illuminance data, the screen wake-up method further includes:
  determining whether the at least two illuminance values are all less than a second illuminance threshold;
  If the at least two illuminance values are not all less than the second illuminance threshold, performing the step of identifying a contact operation corresponding to the set position according to the illuminance data;
  If the at least two illuminance values are all less than a second illuminance threshold, obtaining a duration in which the illuminance value at the set position is less than the second illuminance threshold;
  when the duration is greater than a second set duration, monitoring the motion characteristic parameter of the wearable device;
  when the motion characteristic parameter satisfies the set operation condition corresponding to the screen wake-up, controlling the screen to be switched to the turned-on state.

Optionally, the step of monitoring a motion characteristic parameter of the wearable device includes:
  obtaining acceleration data of the wearable device;
  determining a displacement direction of the wearable device as the motion characteristic parameter according to the acceleration data.

Optionally, after the step of determining a displacement direction of the wearable device as the motion characteristic parameter according to the acceleration data, the screen wake-up method further includes:
  when a change in the displacement direction of the wearable device within a third set duration satisfies a set displacement regulation, and number of times satisfying the set displacement regulation reaches a second set number of times, determining that the motion characteristic parameter satisfies the set operation condition corresponding to the screen wake-up,
  wherein the set displacement regulation is that the displacement direction is switched from a first set direction to a second set direction, and wherein the second set number of times is more than once.

Optionally, the step of monitoring a motion characteristic parameter of the wearable device includes:
  monitoring angular velocity data of the wearable device;
  determining a rotation direction of the wearable device as the motion characteristic parameter according to the angular velocity data.

Optionally, after the step of determining the rotation direction of the wearable device as the motion characteristic parameter according to the angular velocity data, the screen wake-up method further includes:

when a change in the rotation direction of the wearable device within a fourth set duration satisfies a set rotation regulation, and number of times satisfying the set rotation regulation reaches a third set number of times, determining that the motion characteristic parameter satisfies the set operation condition corresponding to the screen wake-up, wherein the set rotation regulation is that the rotation direction is switched from a third set direction to a fourth set direction; and wherein, the third set number of times is more than once.

In addition, in order to achieve the above purpose, the present disclosure further provides a wearable device, wherein the wearable device includes: a housing;

a screen installed on the housing;

an ambient light sensor, for detecting an illuminance at a position where the ambient light sensor is located, the ambient light sensor being installed on the housing; and a screen wake-up device connected with the ambient light sensor, wherein the screen wake-up device includes: a memory, a processor, and a screen wake-up program stored on the memory and operable on the processor, and when the screen wake-up program is executed by the processor, the steps of the screen wake-up method according to any of the items as described above are implemented.

In addition, in order to achieve the above purpose, the present disclosure further provides a readable storage medium on which a screen wake-up program is stored, wherein, when the screen wake-up program is executed by a processor, the steps of the screen wake-up method according to any of the items as described above are implemented.

The present disclosure proposes a screen wake-up method including: when the screen of the wearable device is turned off, monitoring the illuminance at the set position on the wearable device to obtain illuminance data; identifying the contact operation at the set position based on the illuminance data, and when the contact operation satisfies the set contact condition corresponding to the screen wake-up, controlling the screen to be switched to the turned-on state, whereby the screen of the device can only be waken up when the user contacts the set position on the wearable device in a manner corresponding to the set contact condition such that the illuminance at the set position is changed, thereby ensuring that the screen wake-up accurately matches the needs of the user, effectively avoiding the energy consumption generated because the device is unnecessarily waken up by the body movements of the user wearing the wearable device, and improving the endurance capabilities of the wearable device.

BRIEF DESCRIPTION OF DRAWINGS

In order to more clearly illustrate the technical solutions in the embodiments of the present disclosure or the related art, the following will briefly introduce the drawings that need to be used in the description of the embodiments or the related art. Obviously, the accompanying drawings in the following description are only a part of the present disclosure. For those skilled in the art, other drawings may also be obtained according to the provided drawings without inventiveness work.

DETAILED DESCRIPTIONS

According to the main solution of the embodiment of the present disclosure, when a screen of the wearable device is in a turned-off state, performing an illuminance monitoring operation on a set position of the wearable device to obtain illuminance data; identifying a contact operation corresponding to the set position according to the illuminance data; and when the contact operation satisfies a set contact condition corresponding to screen wake-up, controlling the screen to be switched to a turned-on state.

In the related art, the wake-up of the screen of the wearable device is generally performed by identifying the user's operation of lifting the device, and the screen is waken up when the user's lifting operation is identified. However, in this way, all lifting operations of the user in daily life may wake up the screen, causing the screen of the device to be unnecessarily turned on when the user does not need to use the device, for example, the screen of the device is turned on when the user wearing a bracelet lifts his hand to greet to others, which seriously affects the endurance capabilities of the device.

The present disclosure provides the above solution, aiming at improving the endurance capabilities of the wearable device.

An embodiment of the present disclosure provides a wearable device. Specifically, the wearable device may be a smart bracelet, a smart watch, or smart glasses and the like.

Figure 1:
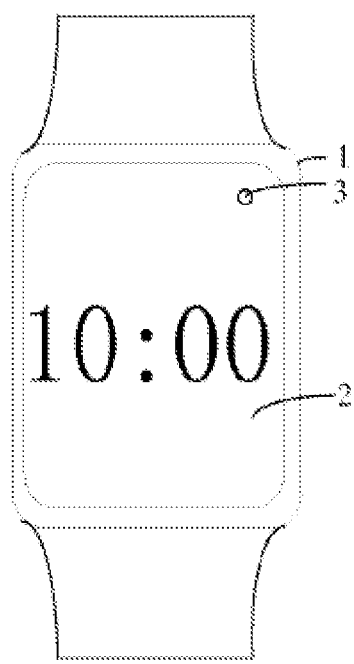
FIG. 1 is a schematic structural diagram of an embodiment of a wearable device of the present disclosure.

In an embodiment of the present disclosure, referring to FIG. 1, the wearable device specifically includes a housing 1, a screen 2 and an ambient light sensor 3. Specifically, a light transmitting hole may be penetrated through the housing 1, and the ambient light sensor 3 is installed on the housing 1 and arranged corresponding to the light transmitting hole. The ambient light may penetrate through the light transmitting hole and irradiate to the ambient light sensor 3 to form detection data. The detection data of the ambient light sensor 3 may reflect the amount of the ambient light irradiated into the hole. On this basis, the ambient light sensor 3 may be used to detect the illuminance at a position where the ambient light sensor is located. When the light transmitting hole is not blocked, the illuminance detected by the ambient light sensor may reflect the actual brightness of the environment where the wearable device is located; when the light transmitting hole is blocked, the light corresponding to the illuminance detected by the ambient light sensor is less than the amount of the actual ambient light where the wearable device is located. In addition, the screen 2 is also installed on the housing 1, and the screen 2 may be used to display information related to the operation of the wearable device. Specifically, the screen 2 may be turned on or turned off according to actual requirements. When the screen 2 is turned on, a backlight of the screen 2 is in a turned-on state, and information is displayed on the screen 2; when the screen 2 is turned off, the backlight of the screen 2 is in a turned-off state and no information is displayed on the screen 2.

Furthermore, the wearable device may further include an acceleration sensor 4 and/or an angular velocity sensor 5. The acceleration sensor 4 and/or the angular velocity sensor 5 are installed in the housing 1. The acceleration sensor 4 may be used to collect acceleration information of the wearable device, so that a motion characteristic parameter of the wearable device can be analyzed by using the collected acceleration information. The angular velocity sensor 5 may be used to collect angular velocity information of the wearable device, so that the motion characteristic parameter of the wearable device can be analyzed by using the collected angular velocity information.

Furthermore, an embodiment of the present disclosure proposes a screen wake-up device, which is applied to monitor the environment of the screen 2 of the above-described wearable device. Specifically, the screen wake-up device may be inserted and disposed inside the above-described housing 1.

Figure 2:
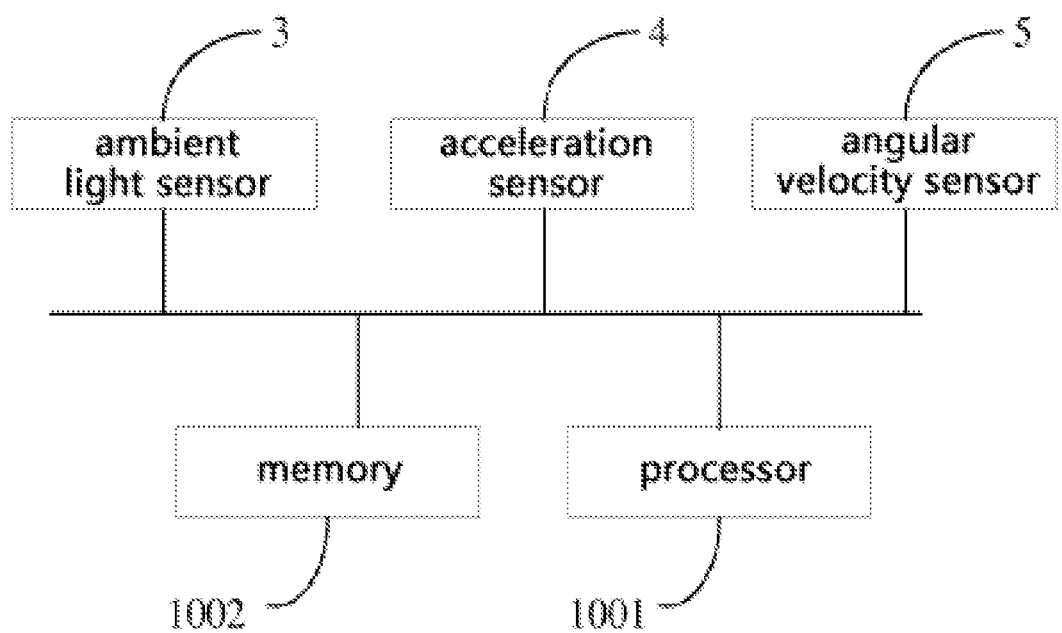
FIG. 2 is a schematic diagram of the hardware structure related to the operation of an embodiment of the screen wake-up device of the present disclosure.

In an embodiment of the present disclosure, referring to FIG. 2, the screen wake-up device includes: a processor 1001 (such as a CPU), a memory 1002 and the like. The memory 1002 may be a high-speed RAM memory, or a stable memory (non-volatile memory), such as a magnetic disk memory. Optionally, the memory 1002 may also be a storage device independent of the above-described processor 1001.

The screen 2, the ambient light sensor 3, the acceleration sensor 4 and the angular velocity sensor 5 described in the above are all connected to the processor 1001. The processor 1001 may obtain the data collected by the ambient light sensor 3, and may also control the turn-on and the turn-off of the screen 2.

Those skilled in the art may understand that the structure of the device shown in FIG. 2 does not limit the device, and may include more components or less components than that shown in the drawings, or combine some components, or arrange different components.

As shown in FIG. 2, the memory 1002 which is a readable storage medium may include a screen wake-up program. In the device shown in FIG. 2, the processor 1001 may be used to call the screen wake-up program stored in the memory 1002 and execute the operations related to the steps of the screen wake-up method in the following embodiments.

An embodiment of the present disclosure also provides a screen wake-up method, which is applied to the screen wake-up of the wearable device described in the above.

Figure 3:
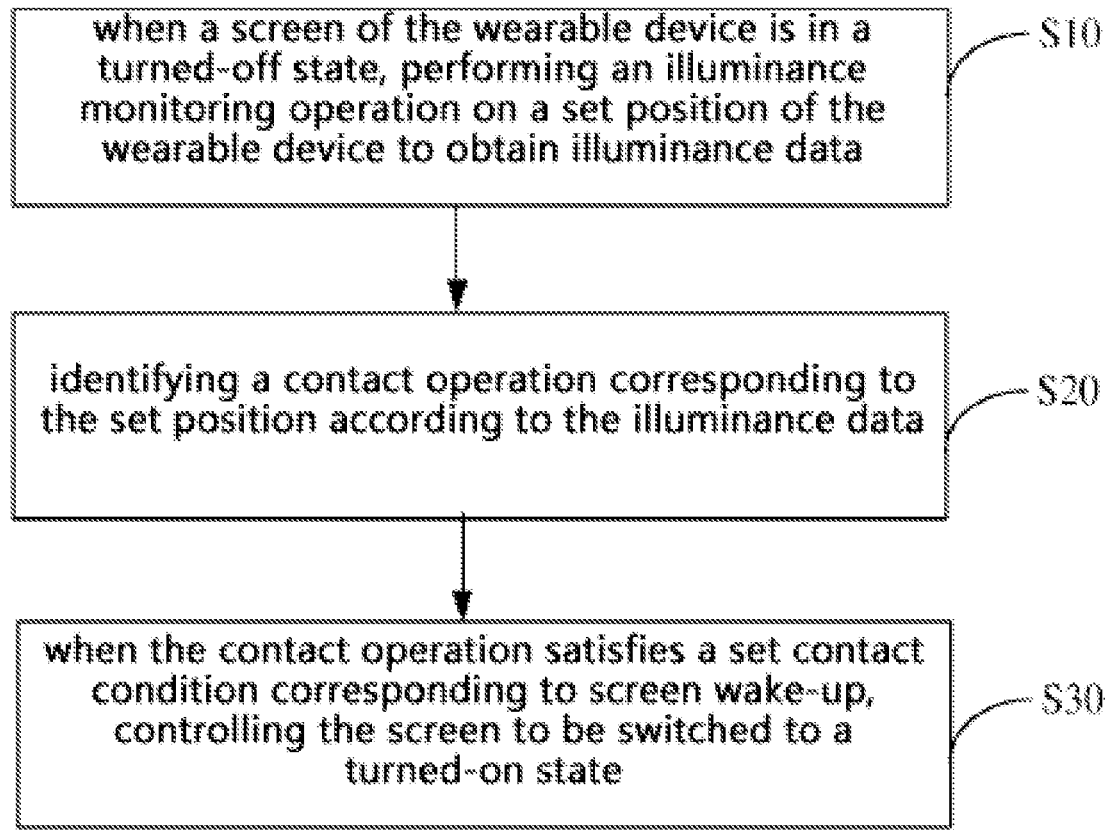
FIG. 3 is a schematic flowchart of an embodiment of the screen wake-up method of the present disclosure.

Referring to FIG. 3, an embodiment of the screen wake-up method of the present disclosure is proposed. In this embodiment, the screen wake-up method includes:

step S10, when a screen of the wearable device is in a turned-off state, performing an illuminance monitoring operation on a set position of the wearable device to obtain illuminance data;

The turned-off state of the screen refers to a state in which the backlight of the screen is turned off. The set position specifically refers to the position where the ambient light sensor is installed on the wearable device, such as the light transmitting hole in the above embodiment.

The illuminance monitoring operation specifically refers to the operation of continuously setting the duration or setting the duration at intervals to obtain the data collected by the ambient light sensor disposed at the set position, and taking the obtained data as the illuminance data herein. Specifically, the larger the value of the data obtained from the ambient light sensor, the greater the illuminance at the set position; the smaller the value of the data obtained from the ambient light sensor, the smaller the illuminance at the set position.

Step S20, identifying a contact operation corresponding to the set position according to the illuminance data;

The contact operation on the set position specifically refers to an operation that the user contacts the set position to change the illuminance at the set position. Since in a case where the ambient light at which the wearable device is located remains unchanged, the user's contact on the set position may cause the light irradiated to the set position in the environment to be reduced, resulting in a change in the illuminance at the set position. On this basis, the change in illuminance at the set position is analyzed by the illuminance data, and the contact operation on the set position can be identified based on the change in illuminance. Specifically, a corresponding relationship between the characteristic parameter representing the illuminance of the contact operations and the various contact operations may be established in advance. Based on this corresponding relationship, it can identify whether a contact operation exists and the operation characteristic parameter of the contact operation (such as the number of times of operations, contact duration for a single operation, total duration for multiple operations, etc.) by using the illuminance data. Specifically, when a characteristic parameter corresponding to a contact operation appears in the illuminance data, it can be determined that a contact operation exists. Furthermore, the operation characteristic parameter of the contact operation may be further analyzed based on the number of times that the characteristic parameter appears in the illuminance data, the collection time, and the like.

Step S30, when the contact operation satisfies a set contact condition corresponding to screen wake-up, controlling the screen to be switched to a turned-on state.

The set contact condition specifically refers to preset operation characteristic of the contact operation required to wake up the screen (such as number of times of operations, contact duration of a single operation, total duration of multiple operations, etc.). If the contact operation satisfies the set contact condition, it indicates that the user has a need to wake up the screen; if the contact operation does not satisfy the set contact condition, it indicates that the user does not have a need to wake up the screen.

The set contact condition may be set according to the actual situation, the set contact condition may be obtained by acquiring the user setting parameter, or the set contact condition may also be the default configuration of the system. The operation characteristic parameter of the current contact operation is analyzed based on the illuminance data, and are compared with the operation characteristic parameter required in the set contact condition. Matching indicates that the contact operation satisfies the set contact condition corresponding to the screen wake-up, and not-matching indicates that the contact operation does not satisfy the set contact condition corresponding to the screen wake-up.

The turned-on state of the screen refers to a state in which the backlight of the screen is turned on. When the identified contact operations satisfy the set contact condition, it indicates that the user has a need to wake up the screen, and thereby the screen is controlled to be switched from the current turned-off state to the turned-on state, so that the backlight of the screen is switched from turn-off into turn-on to realize the lighting of the screen.

Wherein, when the contact operation does not satisfy the set contact condition corresponding to the screen wake-up, the screen may be maintained in the turned-off state.

According to the screen wake-up method proposed in the embodiment of the present disclosure, when the screen of the wearable device is turned off, monitoring the illuminance at the set position on the wearable device to obtain illuminance data; identifying the contact operation at the set position based on the illuminance data; and controlling the screen to be switched to the turned-on state when the contact operation satisfies the set contact condition corresponding to the screen wake-up, whereby the screen of the device can only be waken up when the user contacts the set position on the wearable device in a manner corresponding to the set contact condition such that the illuminance at the set position is changed, thereby ensuring that the screen wake-up accurately matches the needs of the user, effectively avoiding the energy consumption generated because the device is unnecessarily waken up by the body movements of the user wearing the wearable device, and improving the endurance capabilities of the wearable device.

Figure 4:
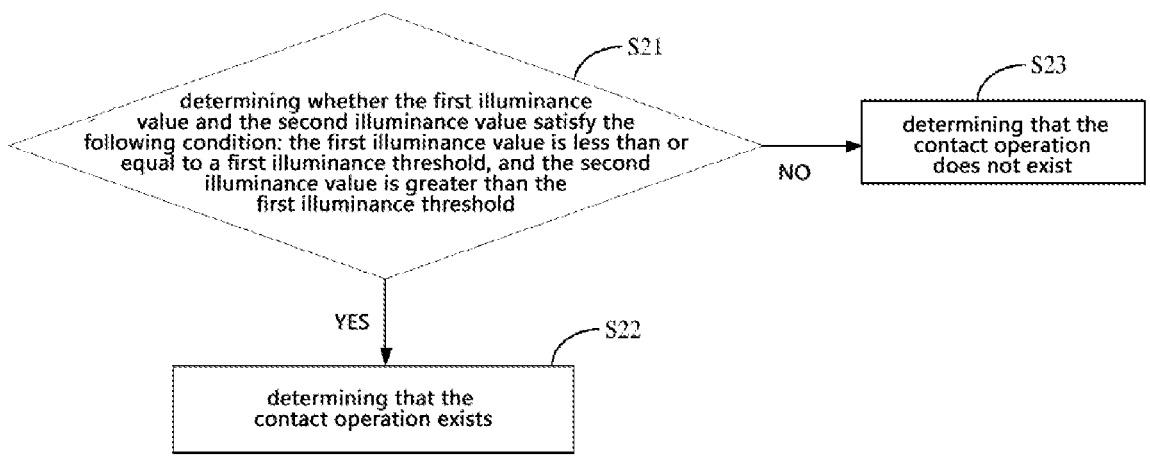
FIG. 4 is a schematic flowchart of another embodiment of the screen wake-up method of the present disclosure.

Further, another embodiment of the screen wake-up method of the present disclosure is proposed based on the foregoing embodiments. In this embodiment, the illuminance data includes at least two illuminance values. Among the at least two illuminance values, one of two illuminance values whose collecting timings are adjacent to each other is defined as the first illuminance value, and the other one of two illuminance values whose collecting timings are adjacent to each other is defined as the second illuminance value. Wherein, the interval time between the collecting timing corresponding to the first illuminance value and the collecting timing corresponding to the second illuminance value may be set according to actual requirements. With reference to FIG. 4, the step S20 includes:

Step S21, determining whether the first illuminance value and the second illuminance value satisfy the following condition: the first illuminance value is less than or equal to a first illuminance threshold, and the second illuminance value is greater than the first illuminance threshold;

If the first illuminance value is less than or equal to a first illuminance threshold and the second illuminance value is greater than the first illuminance threshold, performing step S22; if the first illuminance value is not less than or equal to a first illuminance threshold and the second illuminance value is not greater than the first illuminance threshold, performing step S23;

Step S22, determining that the contact operation exists; and

Step S23, determining that the contact operation does not exist.

The first illuminance threshold specifically refers to a maximum illuminance value corresponding a case where the set position is in a dark state. For example, in this embodiment, the first illuminance threshold is specifically 0, and 0 represents a state where no light irradiates to the set position. In another embodiment, the first illuminance threshold may also be set to 1, 2, 3, and the like according to actual requirements, representing a state where a very small amount of light irradiates to the set position.

The ambient light irradiated to the set position is blocked when the user contacts the set position, as a result, the illuminance at the set position is very small. When the user switches from contacting the set position to not contacting the set position, the original ambient light may be more irradiate to the set position, as a result, the illuminance at the set position is increased. Therefore, when the illuminance at the set position changes from being less than or equal to the first illuminance threshold to being greater than the first illuminance threshold, or when the illuminance at the set position changes from being greater than the first illuminance threshold to being less than or equal to the first illuminance threshold, the user's contact operation can be represented.

Furthermore, in order to improve the accuracy of the identification based on the contact operation, when the first light illuminance value and the second light illuminance value satisfy the above condition, the screen wake-up method, before performing step S22, further includes determining the deviation amount between the first light illuminance value and the second light illuminance value; Step S02 is performed only when the deviation amount is greater than or equal to a set threshold.

In addition, in another embodiment, it may also define an illuminance value whose collecting timing is after that of the second illuminance value as a third illuminance value, and when the first illuminance value is greater than the first illuminance threshold, the second illuminance value is less than or equal to the first illuminance threshold and the third illuminance value is greater than the first illuminance threshold, it is determined that a contact operation exists.

In this embodiment, it is identified whether a contact operation occurs at the set position, based on the numerical change in the illuminance values at the set position, whose collecting timings are adjacent to each other, wherein when the illuminance is switched from a sufficiently dark state to a brighter state, it is determined that a contact operation exists, thereby realizing accurate identification of the user's operation of contacting the set position based on the illuminance data.

Figure 5:
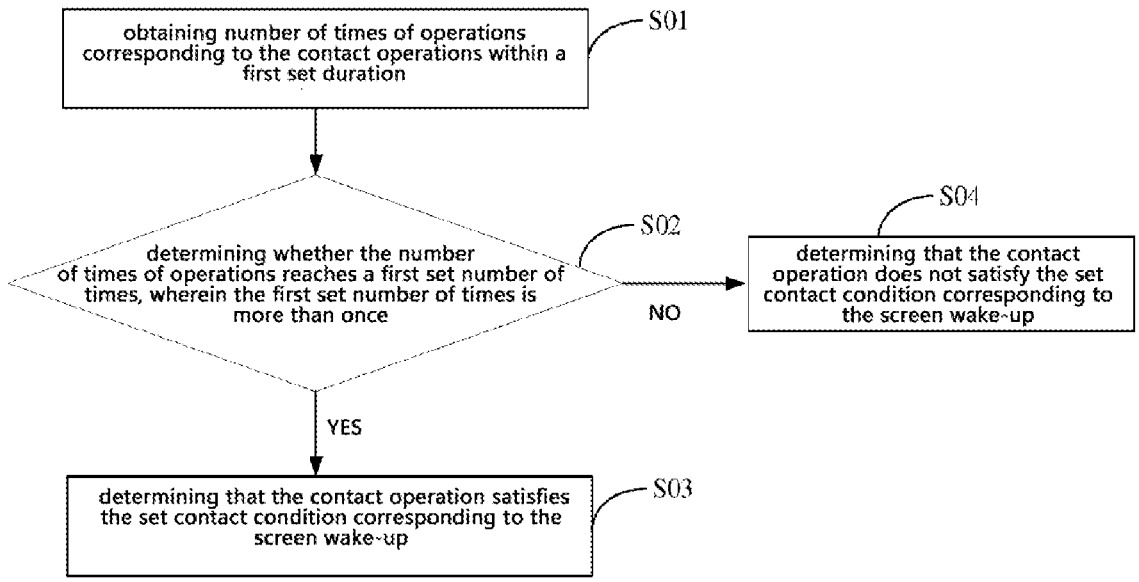
FIG. 5 is a schematic flowchart of determining whether the contact operation satisfies the set contact condition according to another embodiment of the screen wake-up method of the present disclosure.

Furthermore, in this embodiment, referring to FIG. 5, after step S22, the screen wake-up method may further include:

Step S01, obtaining number of times of operations corresponding to the contact operations within a first set duration;

The specific time length of the first set duration may be set according to the actual situation, may be set by the user, or may also be a default setting of the system. In this embodiment, the first set duration is specifically 2 seconds. In another embodiment, the first set duration may also be set to other longer or shorter time, such as 1 second, 3 seconds, 2.5 seconds, 4 seconds and so on.

The illuminance data may specifically include a plurality of illuminance values at the set position detected within the first set duration. It may be identified whether a contact operation exists and the number of times of the contact operations, based on the illuminance data monitored within the first set duration. Specifically, if the illuminance values corresponding to the adjacent collecting timings satisfy the condition in the above step S01 N times (N is greater than or equal to 1, and N is an integer) in the obtained illuminance data, it indicates that the number of times of the operation within the first set duration is N.

The first set duration may be counted from the time when the contact operation is identified at the first time after the screen enters the turned-off state. Specifically, the earliest collecting timing in the illuminance value corresponding to the contact operation identified at the first time may be set as the starting timing of time counting of the first set duration. If the contact operation does not satisfy the set contact condition during the period of reaching the first set duration from the starting timing, the first set duration is re-counted from when the contact operation is identified once again next time, and it is re-identified whether the contact operation satisfies the set contact condition within the first set duration. As such, the contact operation is continuously identified and analyzed in a state that the screen is turned off, until the detected contact operation satisfies the set contact condition.

Step S02, determining whether the number of times of operations reaches a first set number of times, wherein the first set number of times is more than once.

When the number of times of operations reaches the first set number of times, step S03 is performed; when the number of times of operations is less than or equal to the first set number of times, step S04 is performed.

The first set number of times may be set according to actual requirements. In this embodiment, the first set number of times is specifically 2. Specifically, it may be determined that the number of times of operations has reached the first set number of times when the number of times of operations is two times, otherwise it may be determined that the number of times of operations has not reached the first set number of times. It may also be determined that the number of times of operations has reached the first set number of times when the number of times of operations are at least 2, otherwise it may be determined that the number of times of operations has not reached the first set number of times. In another embodiment, according to actual requirements, the first set number of times may also be set to more times, such as 3 times, 4 times, etc.

Step S03, determining that the contact operation satisfies the set contact condition corresponding to the screen wake-up.

Step S04, determining that the contact operation does not satisfy the set contact condition corresponding to the screen wake-up.

In this embodiment, the screen is waken up only when the contact operation occurs more than once within the first set duration; otherwise, the screen is not waken up, thereby ensuring that the screen is waken up only when the user contacts the set position at least twice, guaranteeing that the screen wake-up accurately matches the needs of the user, and effectively preventing the screen from unnecessarily wakening up by error contact of the user or other objects, and further improving the endurance capabilities of the screen.

Figure 6:
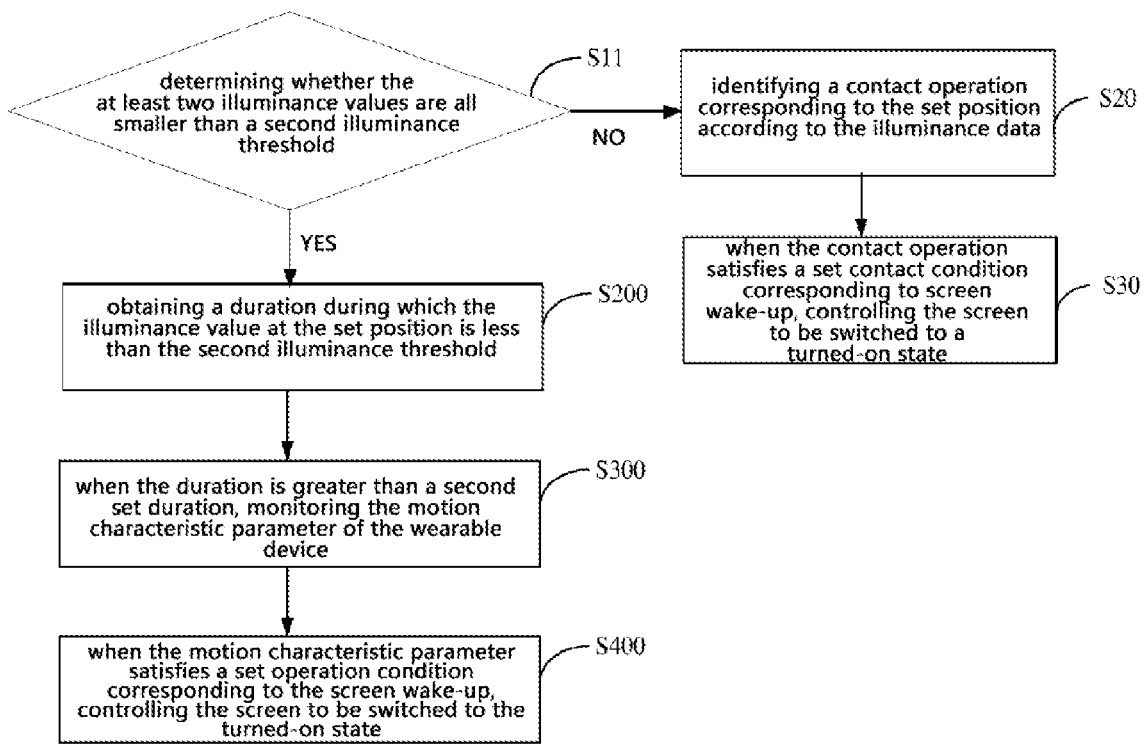
FIG. 6 is a schematic flowchart of still another embodiment of the screen wake-up method of the present disclosure.

Furthermore, based on any of the above-described embodiments, another embodiment of the screen wake-up method of the present disclosure is proposed. In this embodiment, the illuminance data includes at least two illuminance values. Referring to FIG. 6, after step S10, the screen wake-up method further includes:

Step S11, determining whether the at least two illuminance values are all smaller than a second illuminance threshold;

If the at least two illuminance values are not all smaller than a second illuminance threshold, performing step S20; if the at least two illuminance values are all smaller than a second illuminance threshold, performing step S200, step S300, and step S400;

The magnitude of the second illuminance threshold herein may be set according to actual requirements. It should be noted that, the second illuminance threshold herein and the first illuminance threshold in the above embodiment may be set to the same or different values according to actual requirements, and the magnitude relationship between the two thresholds is not specifically limited.

Specifically, setting the duration at intervals to obtain the illuminance value at the set position as the illuminance data. When at least two illuminance values obtained consecutively are all less than the second illuminance threshold, it indicates that the wearable device may be in a dark state; when at least two illuminance values obtained consecutively exist illuminance value greater than or equal to the second illuminance threshold, it indicates that the environment where the wearable device is located is well-lit.

Step S200, obtaining a duration during which the illuminance value at the set position is less than the second illuminance threshold;

Specifically, in a state that the screen is turned off, continuously monitoring the illuminance value at the set position. Whenever it is monitored that the illuminance value changes from being greater than or equal to the second illuminance threshold to being less than the second illuminance threshold, this timing is set as the starting point of time counting. As long as the monitored illuminance value is less than the second illuminance threshold, the time counting state is maintained until it is monitored that the illuminance value changes from being less than the second illuminance threshold to being greater than or equal to the second illuminance threshold, and then terminating and resetting the time counting. On this basis, the time counting duration at the current timing, which takes the starting point of time counting as the starting timing, may be obtained as the duration herein.

Step S300, when the duration is greater than a second set duration, monitoring the motion characteristic parameter of the wearable device;

It should be noted that, the second set duration in this embodiment is longer than the first set duration in the foregoing embodiments.

Because in a well-lit environment, the user's contact operation or the contact by other objects generally only results in a smaller illuminance value at the set position in a short period of time. If the duration is longer than the second set duration, it indicates that the wearable device is in a dark environment; if the duration is less than or equal to the second set duration, it may continue to monitor and identify the illuminance data at the set location.

The motion characteristic parameter specifically refers to the characteristic parameter that represents the motion characteristics of the wearable device in the space where the wearable device is located, such as movement and rotation. The motion characteristic parameter may specifically include displacement direction, displacement magnitude, rotation direction and/or rotation magnitude, and the like. Specifically, the motion characteristic parameter can be obtained by analyzing data detected by the acceleration sensor and/or the angular velocity sensor in the wearable device.

When the duration is longer than the second set duration, continuously setting the duration or setting the duration at intervals to obtain data detected by the acceleration sensor and/or angular velocity sensor, and analyzing the motion characteristic parameter of the wearable device is based on the obtained data.

Step S400, when the motion characteristic parameter satisfies a set operation condition corresponding to the screen wake-up, controlling the screen to be switched to the turned-on state.

The set operation condition specifically refers to the preset movement characteristic (such as displacement direction, displacement magnitude, rotation direction and/or rotation magnitude, etc.) of the movement of the wearable device in a space, required to be satisfied for waking up the screen. If the motion characteristic parameter satisfies the set operation condition, it indicates that the user has a need to wake up the screen; if the motion characteristic parameter does not satisfy the set operation condition, it indicates that the user does not have the need to wake up the screen.

The set operation condition may be set according to the actual situation, which may be obtained by acquiring the user setting parameter, or may also be the default configuration of the system. The motion characteristic parameter is compared with the action characteristic parameter required in the set operation condition. Matching indicates that the motion characteristic parameter satisfies the set operation condition corresponding to the screen wake-up, and not-matching indicates that the motion characteristic parameter does not satisfy the set operation condition corresponding to the screen wake-up.

Since the wearable device is in a dark environment, a change in the illuminance at the set position caused by the user's contact on the set position is very small or even no change, as a result, the user's contact cannot be effectively identified by monitoring based on the illuminance data at the set position. Therefore, in this embodiment, when it is determined that the wearable device is in a dark environment through the above method, the screen is waken up based on the monitoring of the motion characteristic parameter of the wearable device, so as to ensure that the screen wake-up can be effectively achieved by changing the motion state of the wearable device even though the user is in a dark environment.

In an implementation of this embodiment, the step of monitoring a motion characteristic parameter of the wearable device specifically includes: obtaining acceleration data of the wearable device; and determining the displacement direction of the wearable device as the motion characteristic parameter according to the acceleration data. On this basis, the position where the acceleration of the wearable device is 0 may be taken as the zero point, and the vector direction of the acceleration may be taken as the displacement direction of the wearable device.

On this basis, when a change in the displacement direction of the wearable device within the third set duration satisfies the set displacement regulation, and the number of times satisfying the set displacement regulation reaches the second set number of times, it is determined that the motion characteristic parameter satisfies the set operation condition corresponding to the screen wake-up. The set displacement regulation is that the displacement direction is switched from the first set direction to the second set direction. Wherein, the second set number of times is more than once. In this embodiment, the first set direction and the second set direction are specifically two directions that are parallel to each other and directed to opposite directions, such as the downward direction and the upward direction in the vertical direction, and the left direction and the right direction in the horizontal direction. In another embodiment, the first set direction and the second set direction may also be set as other two different directions specified in space (for example, two directions in different directions), according to actual requirements. In this embodiment, the second set number of times is specifically 2. Specifically, when the number of times that the displacement direction of the wearable device satisfies the set displacement regulation within the third set duration is two times, it is determined that the number of times reaches the second set number of times; otherwise, it is determined that the number of times does not reach the second set number of times. It is also possible to determine that the number of times reaches the second set number of times if the number of times that the displacement direction of the wearable device satisfies the set displacement regulation within the third set duration is at least two times; otherwise, it may be determined that the number of times does not reach the second set number of times. In another embodiment, according to actual requirements, the second set number of times may also be set to more times, such as 3 times, 4 times, etc.

Specifically, the time counting may be started when it is identified at the first time that the motion characteristic parameter satisfies the set displacement regulation after starting to monitor the motion characteristic parameter, and if the motion characteristic parameter does not satisfy the set operation condition during the period of reaching the third set duration from the start timing, then the time counting for the third set duration may be restarted when it is identified once again that the motion characteristic parameter satisfies the set displacement regulation at the next time, and then re-identifying whether the motion characteristic parameter satisfies the set operation condition within the third set duration. As such, the motion characteristic parameter is continuously identified and analyzed in a state that the screen is turned off, until the detected motion characteristic parameter satisfies the set operation condition. The specific duration of the third set duration may be set according to the actual situation, may be set by the user, or may also be the default setting of the system. In this embodiment, the third set duration is specifically 2 s. In another embodiment, the third set duration may also be set to other longer or shorter time, such as 1 second, 3 seconds, 2.5 seconds, 4 seconds, etc.

For example, in this embodiment, when it is detected that the wearable device reciprocates twice in the up and down direction within 2 seconds, the screen can be waken up; otherwise, the screen is maintained in the turned-off state.

In another implementation of this embodiment, the step of monitoring a motion characteristic parameter of the wearable device specifically includes: monitoring the angular velocity data of the wearable device; and determining the rotation direction of the wearable device as the motion characteristic parameter according to the angular velocity data. On this basis, the position where the angular velocity of the wearable device is 0 may be taken as the zero point, and the vector direction of the angular velocity may be taken as the rotation direction of the wearable device.

On this basis, when a change in the rotation direction of the wearable device within the fourth set duration satisfies the set rotation regulation, and the number of times satisfying the set rotation regulation reaches the third set number of times, it is determined that the motion characteristic parameter satisfies the set operation condition corresponding to the screen wake-up; the set rotation regulation is that the rotation direction is switched from the third set direction to the fourth set direction. Wherein, the third set number of times is more than once. The third set direction and the fourth set direction are specifically clockwise direction and counterclockwise direction, respectively. Specifically, the third set direction is clockwise direction and the fourth set direction is counterclockwise direction. Or, the third set direction is counterclockwise direction and the fourth set direction is clockwise direction. Specifically, when the number of times that the rotation direction of the wearable device satisfies the set rotation regulation within the fourth set duration is two times, it is determined that the number of times reaches the third set number of times; otherwise, it is determined that the number of times does not reach the third set number of times. It is also possible to determine that the number of times reaches the third set number of times when the number of times that the rotation direction of the wearable device satisfies the set rotation regulation within the fourth set duration is at least two times; otherwise, it is determined that the number of times does not reach the third set number of times.

Specifically, the time counting may be started when it is identified at the first time that the motion characteristic parameter satisfies the set rotation regulation after starting to monitor the motion characteristic parameter, and if the motion characteristic parameter does not satisfy the set operation condition during the period of reaching the fourth set duration from the start timing, then the time counting for the fourth set duration may be restarted when it is identified once again that the motion characteristic parameter satisfies the set rotation regulation at the next time, and then re-identifying whether the motion characteristic parameter satisfies the set operation condition within the fourth set duration. As such, the motion characteristic parameter is continuously identified and analyzed in a state that the screen is turned off, until the detected motion characteristic parameter satisfies the set operation condition. The first set number of times can be set according to actual requirements. The specific duration of the fourth set duration may be set according to the actual situation, may be set by the user, or may also be the default setting of the system. In this embodiment, the fourth set duration is specifically 2 seconds. In another embodiment, the fourth set duration may also be set to other longer or shorter time, such as 1 second, 3 seconds, 2.5 seconds, 4 seconds, etc.

For example, in this embodiment, when it is detected that the wearable device reciprocates twice in clockwise direction and counterclockwise direction within 2 seconds, the screen can be waken up; otherwise, the screen is maintained in the turned-off state.

In addition, in this embodiment, acceleration data and angular velocity data may also be obtained at the same time, and the displacement direction and the rotation direction of the wearable device may be determined based on the obtained data. When one of the displacement direction and the rotation direction satisfies the above-described set operation condition, the screen is waken up.

In this embodiment, by means of any of the above implementations, the screen is waken up only when the user repeatedly changes the motion state (displacement direction or rotation direction) of the wearable device in a dark environment in accordance with the set regulation, thereby ensuring that the wake-up of the screen to match with the actual requirements of users and further ensuring the endurance capabilities of wearable device.

In addition, an embodiment of the present disclosure also proposes a readable storage medium on which a screen wake-up program is stored, and when the screen wake-up program is executed by a processor, the relevant steps of any of the above-described embodiments of the screen wake-up method are implemented.

It should be noted that, herein, the term "comprising", "including" or any other variation thereof is intended to cover a non-exclusive inclusion such that a process, method, article or system comprising a set of elements includes not only those elements, but also other elements not expressly listed, or elements inherent in the process, method, article, or system. Without further limitations, an element defined by the phrase "comprising a . . . " does not preclude the presence of additional identical elements in the process, method, article, or system comprising that element.

The serial numbers of the above embodiments of the present disclosure are for description only, and do not represent the advantages and disadvantages of the embodiments.

Through the description of the above embodiments, those skilled in the art may clearly understand that the methods of the above embodiments may be implemented by means of software and a necessary general-purpose hardware platform, and, of course, also may be implemented by hardware, but in many housings the former is better implementation. Based on this understanding, the essence of the technical solution of the present disclosure or the part that contributes to the related art may be embodied in the form of a software product, and the computer software product is stored in a storage medium as described above (such as ROM/RAM, magnetic disk, optical disk), including several instructions to make a terminal apparatus (which may be a mobile phone, computer, server, wearable device, or network equipment, etc.) execute the methods described in various embodiments of the present disclosure.

The above are only preferred embodiments of the present disclosure, and are not intended to limit the patent scope of the present disclosure. All equivalent structures or equivalent process transformations made by using the description of the disclosure and the accompanying drawings are directly or indirectly used in other related technical fields, are all included in the patent protection scope of the present disclosure in the same way.

What is claimed is:

1. A screen wake-up method, which is applied to a wearable device, wherein the screen wake-up method comprises the following steps:
   when a screen of the wearable device is in a turned-off state, performing an illuminance monitoring operation on a set position of the wearable device to obtain illuminance data;
   identifying a contact operation corresponding to the set position according to the illuminance data; and
   when the contact operation satisfies a set contact condition corresponding to screen wake-up, controlling the screen to be switched to a turned-on state,
   wherein the illuminance data includes at least two illuminance values, and wherein after performing an illuminance monitoring operation on a set position of the wearable device to obtain illuminance data, the screen wake-up method further comprises:
   determining whether the at least two illuminance values are all less than a second illuminance threshold;
   if the at least two illuminance values are not all less than the second illuminance threshold, performing identifying a contact operation corresponding to the set position according to the illuminance data; and
   if the at least two illuminance values are all less than the second illuminance threshold, obtaining a duration in which the illuminance value at the set position is less than the second illuminance threshold,
   when the duration is greater than a second set duration, monitoring a motion characteristic parameter of the wearable device, and
   when the motion characteristic parameter satisfies a set operation condition corresponding to the screen wake-up, controlling the screen to be switched to the turned-on state.

2. The screen wake-up method according to claim 1, wherein the illuminance data comprises at least two illuminance values, and identifying a contact operation corresponding to the set position according to the illuminance data comprises:

when a first illuminance value is less than or equal to a first illuminance threshold and a second illuminance value is greater than the first illuminance threshold, determining that the contact operation exists, wherein, among the at least two illuminance values, one of the two illuminance values whose collecting timings are adjacent to each other is defined as the first illuminance value, and the other one of the two illuminance values whose collecting timings are adjacent to each other is defined as the second illuminance value.

3. The screen wake-up method according to claim 2, wherein after determining that the contact operation exists, the screen wake-up method further includes:

obtaining number of times of operations corresponding to the contact operation within a first set duration; and when the number of times of operations reaches a first set number of times, determining that the contact operation satisfies the set contact condition corresponding to the screen wake-up, wherein the first set number of times is more than once.

4. The screen wake-up method according to claim 1, wherein monitoring a motion characteristic parameter of the wearable device comprises:

obtaining acceleration data of the wearable device; and determining a displacement direction of the wearable device as the motion characteristic parameter according to the acceleration data.

5. The screen wake-up method according to claim 4, wherein after determining a displacement direction of the wearable device as the motion characteristic parameter according to the acceleration data, the screen wake-up method further comprises:

when a change in the displacement direction of the wearable device within a third set duration satisfies a set displacement regulation, and number of times satisfying the set displacement regulation reaches a second set number of times, determining that the motion characteristic parameter satisfies the set operation condition corresponding to the screen wake-up, wherein the set displacement regulation is that the displacement direction is switched from a first set direction to a second set direction, and wherein the second set number of times is more than once.

6. The screen wake-up method according to claim 4, wherein monitoring a motion characteristic parameter of the wearable device comprises:

monitoring angular velocity data of the wearable device; and determining a rotation direction of the wearable device as the motion characteristic parameter according to the angular velocity data.

7. The screen wake-up method according to claim 6, wherein after determining a rotation direction of the wearable device as the motion characteristic parameter according to the angular velocity data, the screen wake-up method further comprises:

when a change in the rotation direction of the wearable device within a fourth set duration satisfies a set rotation regulation, and number of times satisfying the set rotation regulation reaches a third set number of times, determining that the motion characteristic parameter satisfies the set operation condition corresponding to the screen wake-up, wherein the set rotation regulation is that the rotation direction is switched from a third set direction to a fourth set direction, and wherein the third set number of times is more than once.

8. A wearable device, comprising:

a housing;

a screen installed on the housing;

an ambient light sensor for detecting an illuminance at a position where the ambient light sensor is located, the ambient light sensor being installed on the housing; and a screen wake-up device connected to the ambient light sensor, wherein the screen wake-up device comprises: a memory, a processor, and a screen wake-up program stored on the memory and operable on the processor, and when the screen wake-up program is executed by the processor, the steps of the screen wake-up method according to claim 1 are implemented.

9. A non-transitory readable storage medium on which a screen wake-up program is stored, wherein, when the screen wake-up program is executed by a processor, the steps of the screen wake-up method according to claim 1 are implemented.

* * * * *